Figure 1:
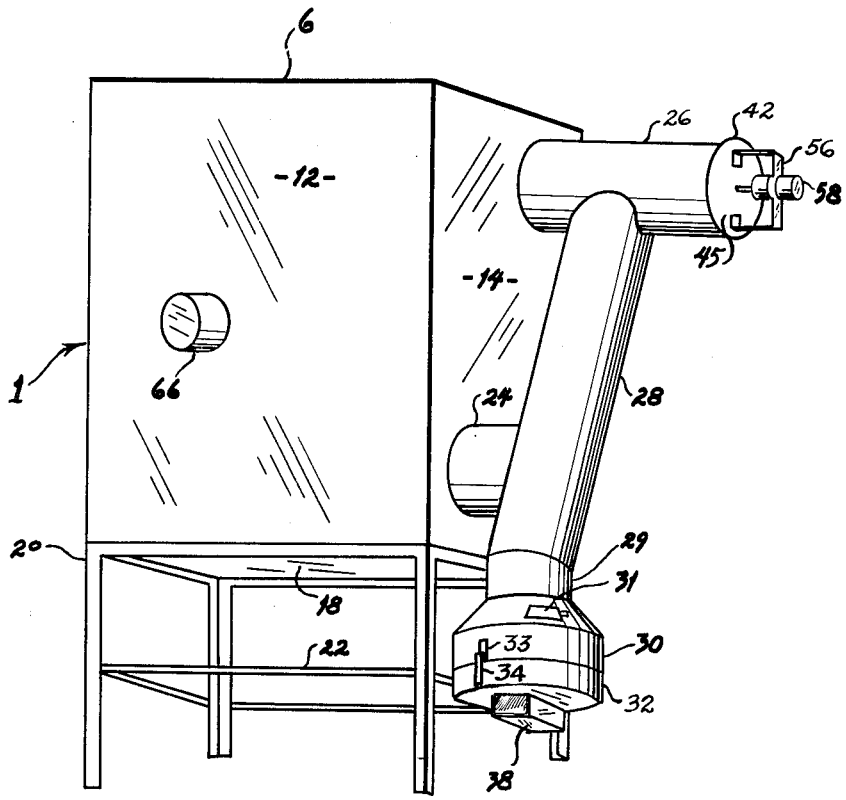

Dec. 14, 1965     J. A. POWELL     3,223,022
SMOKE-HEATING MEANS
Filed Feb. 14, 1961     3 Sheets-Sheet 1

INVENTOR.
JACOB A. POWELL
BY
ATTORNEY

Dec. 14, 1965     J. A. POWELL     3,223,022
SMOKE-HEATING MEANS
Filed Feb. 14, 1961     3 Sheets-Sheet 2

INVENTOR.
JACOB A. POWELL
BY
ATTORNEY

United States Patent Office 3,223,022
Patented Dec. 14, 1965

3,223,022
SMOKE-HEATING MEANS
Jacob A. Powell, Reseda, Calif.
(8823 Lankershim Blvd., Apt. 1, Sun Valley, Calif.)
Filed Feb. 14, 1961, Ser. No. 89,304
1 Claim. (Cl. 99—259)

This invention concerns improved apparatus for treating various kinds of meat, fish, fowl or other edibles by exposing the same to smoke, either with or without simultaneous cooking of the stated edibles. More particularly, this invention concerns improved lightweight, portable and simplified apparatus for performing the stated functions with increased efficiency, rapidity and economy, in a manner creating a minimum of noise or nuisance.

The invention disclosed herein is broadly applicable to treatment of edibles of various composition in relatively small quantities by the use of smoke, fumes or similar media obtained from exposing a suitable substance to a controlled amount of heat. However, a particular need for this invention exists in connection with such sports as hunting and fishing, which are enjoyed by a substantial portion of the public at large, most of whom are unfamiliar with procedures and devices by means of which fish or game may be improved by smoking, such as enhancing its flavor and its storage characteristics.

At present, it is generally impossible for the average sportsman to smoke, cure, or otherwise treat fish, game or other edibles in small quantities, since devices for accomplishing the stated type of treatment are primarily limited to large commercial installations such as used in the meat packing industry. Use of such devices in residential areas by a private individual would be extremely impractical in view of their size, which may approximate the size of an average house. Moreover, in cities such as Los Angeles having municipal ordinances which closely regulate the operation of incinerators or in fact any smoke-producing activity, the use of devices known to the prior art for smoking meat or other edibles would not be permitted to the general public. Conventional devices of the type stated would not conform to the rigid legal requirements based upon smog control, since they vent or otherwise direct smoke into the surrounding atmosphere either continuously or intermittently during their operation.

In addition, many of the conventional devices known to the prior art for smoking meat or other edibles are complicated, involving specialized operating techniques, large quantities of exotic fuels or combustibles to provide fumes or smoke of particular types or properties, and tedious or time-consuming in their operation. For example, where particular conditions of temperature, moisture, and pressure are desired in the treatment chamber, in accordance with a precise schedule or sequence of change, the controls and equipment necessary to provide such conditions are costly, cumbersome, and difficult to operate. Alternatively, where the desired treatment merely involves passage of smoke over or near the treated specimen, and the action of gravity or relative temperature effects are relied upon to accomplish passage in the desired direction, the treatment process is unduly prolonged, often lasting many hours while smoke leisurely drifts around the ceiling or settles in low corners or otherwise contacts the specimen briefly, sporadically, and by the merest chance.

Therefore, the need for some means by which smoke treatment of edibles in small quantities in a manner suitable for private individuals in residential areas has gone unfilled until the invention of the means disclosed herein.

Accordingly, it is a principal object of this invention to provide improved means by which edibles in small quantities may be smoke-treated in a manner suitable for crowded residential areas.

It is a further object of this invention to provide means as set forth in the above object which accomplishes smoke-treatment with the improved efficiency, rapidity, and effectiveness.

It is an additional object in this case to provide means as set forth in the above objects which may be operated by persons lacking particular skill in the curing or smoke-treatment of edibles.

It is also an object in this case to provide means as set forth in the above objects which accomplishes smoke-treatment of edibles in small quantities with improved economy.

It is a further object of this invention to provide means as set forth in the above objects which will not emit or exude smoke or fumes in any amount to the surrounding atmosphere during its operation.

It is an additional object of this invention to provide means as set forth in the above objects having relatively small, compact form and lightweight, such as to permit improved ease of storage and portability.

It is another object in this case to provide apparatus as set forth in the various preceding objects including in addition thereto means for simultaneously cooking, roasting or barbecuing an edible during smoke-treatment thereof.

Figures 3, 4:
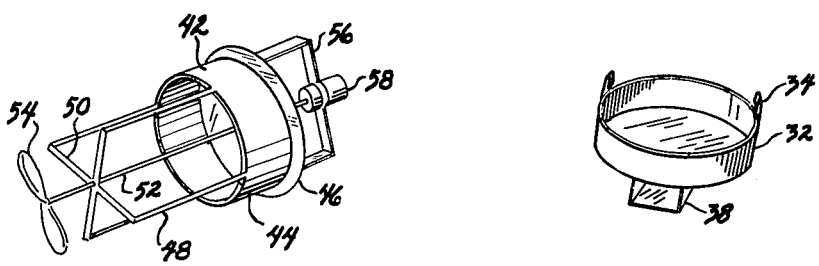
Figure 2:
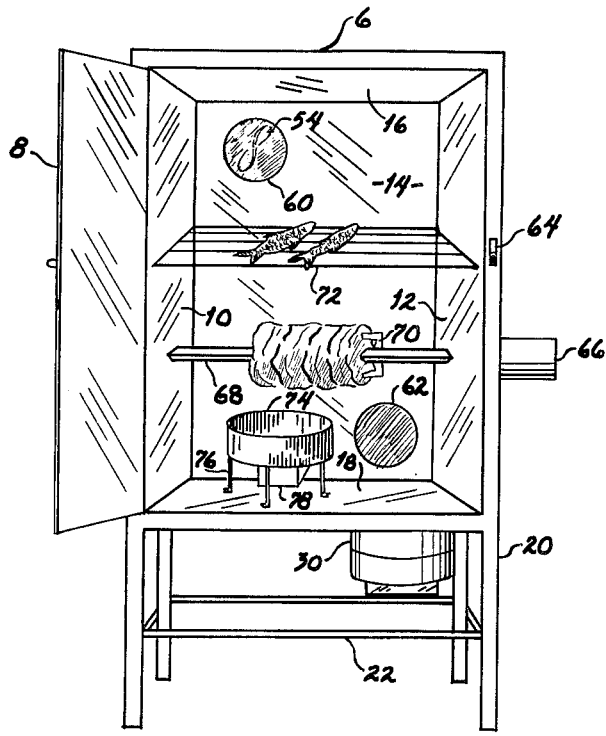
Figures 5, 6:
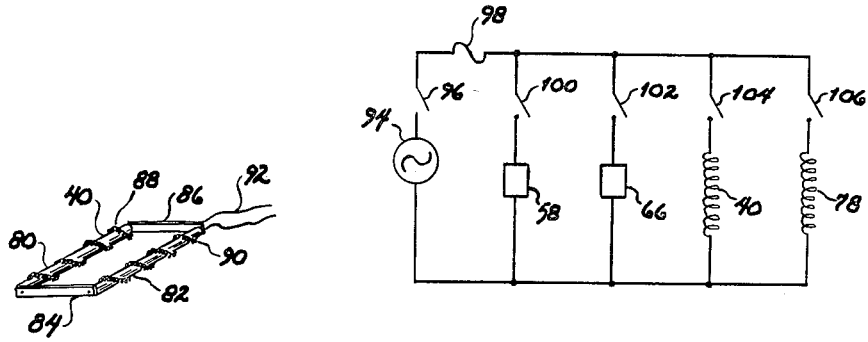
Figure 7:
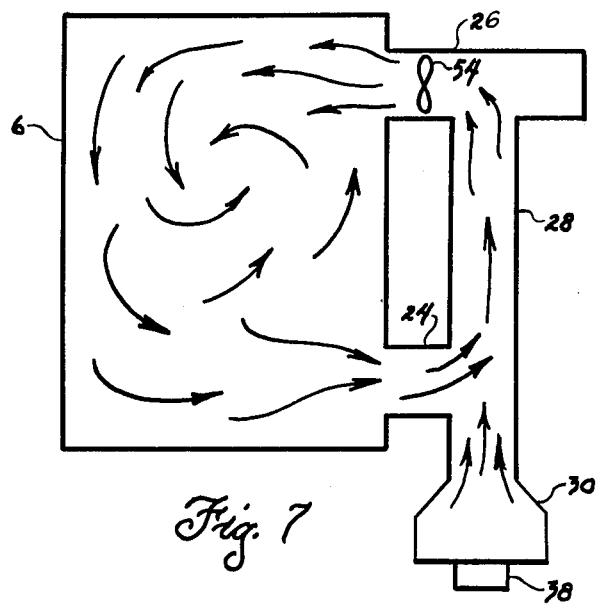
Figure 8:
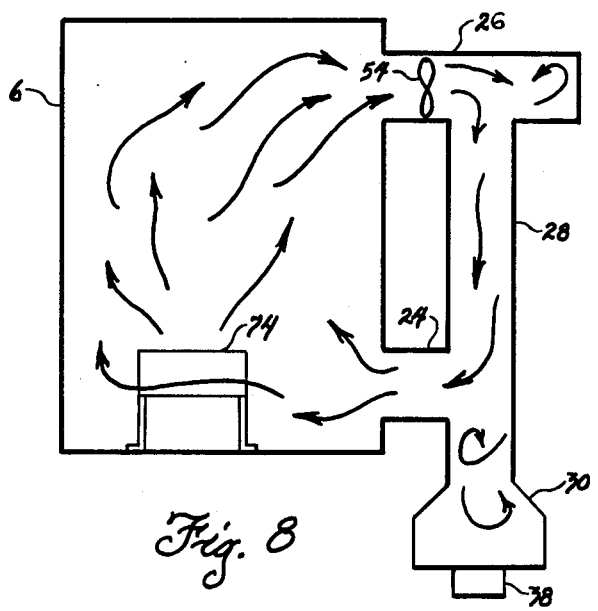

Other important objects and advantages of the instant invention will become apparent upon a close reading of the following detailed description of an illustrative embodiment of the invention, reference being had to the accompanying drawings, wherein:

FIGURE 1 shows a general perspective view of the novel apparatus disclosed herein, FIGURE 2 shows a front orthographic projection of the apparatus of FIGURE 1, FIGURE 3 shows an isolated perspective view of the power blower means which forms a component part of the apparatus of FIGURES 1 and 2, FIGURE 4 shows an isolated perspective view of the fuel pan which forms part of the smoke-producing means in the apparatus of FIGURES 1 and 2, FIGURE 5 shows an isolated perspective view of a typical heating element which forms part of the smoke-producing means in the apparatus of FIGURES 1 and 2, FIGURE 6 shows a schematic diagram of an electrical circuit which may be used to power the apparatus of FIGURES 1 and 2, FIGURE 7 is a general schematic view of the apparatus of FIGURES 1 and 2 in side elevation, showing the flow pattern of smoke resulting from operation of the blower means of FIGURE 3, and FIGURE 8 is a general schematic view of the apparatus of FIGURES 1 and 2 in side elevation, showing the flow pattern of smoke resulting from operation of the blower means of FIGURE 3 in a direction opposite from that relative to the showing of FIGURE 7.

With reference to the drawings described above, and particularly to FIGURES 1 and 2, the apparatus disclosed herein comprises a smoke-treating device generally designated by reference numeral 1, and may be seen to include a cabinet 6 having a door 8 hingeably mounted thereon. Cabinet 6 is made of generally flat lightweight material in sheet form such as plywood, tin or aluminum, forming sides 10 and 12, a back wall 14, with top and bottom portions 16 and 18, respectively, constituting a complete enclosure. With door 8 fully closed and held by suitable latching means, cabinet 6 forms a hollow container, the interior of which is completely isolated from atmosphere surrounding the exterior thereof, except for certain controlled points of communication between the interior and exterior as set forth in greater detail below. As shown by FIGURES 1 and 2, cabinet 6 may be supported by appropriate means such as lightweight channel members 20 forming an upright leg at each corner of the cabinet, with bracing 22 for additional structural support of the stated members.

With particular reference to FIGURE 1, smoke-treating device 1 may be seen further to include a system of ducts or passages for the recirculation of smoke or other fluids therethrough. Thus, for example, in a typical operating condition of the device, smoke leaving the enclosed area of chamber 6 may exit through duct 24 and flow upwardly through transverse or intermediate duct 28 to upper or fan duct 26 and thence re-enter chamber 6. A suitable source for supplying smoke, fumes, or other curing media is provided in the form of source 30 connected to duct 28 by means of duct 29. Smoke source 30 includes a removable portion in the form of fuel pan 32 which may be held in place during use by suitable means such as a metallic strap 34 on opposite sides thereof and deformed at their upper ends to form hooks which engage similar but oppositely directed bends in a pair of similar straps 36 affixed to the relatively immobile adjacent portion of smoke source 30. An opening in the upper portion of smoke source 30 covered by a door 31 as shown in FIGURE 1 is provided for use in admitting additional air into the system when desired. Appropriate means for heating the contents of fuel pan 32 are provided in the form of heating element 40 shown in FIGURE 5 which may be supported within a suitable housing 38 affixed to the underside of fuel pan 32 as shown more particularly by FIGURES 1 and 4.

Means are further provided in smoke-treating device 1 to cause recirculating flow of smoke or other curing media through cabinet 6. The stated means include a fan unit 42 removably supported within upper duct 26 and shown in isolated perspective by FIGURE 3. Fan unit 42 includes a sleeve section 44 of slightly smaller diameter than duct 26 and having closure means 45 covering one end of the sleeve section and providing in addition an annular overhanging portion which forms a flange 46 for limiting the extent to which cylindrical sleeve section 44 may be inserted within duct 26 during installation thereof. Sleeve section 44 is also provided with a cage section 48 having outer dimensions not exceeding those of sleeve section 44 and terminating in a cross member 50 as shown by FIGURE 3. Cross member 50 is provided with a bearing at the center thereof through which a drive shaft 52 having a propeller 54 mounted on the distal end thereof is rotatably journalled. At the end of drive shaft 52 opposite from its connection with propeller 54, a reversible drive motor 58 is connected to provide drive means for the propeller. Suitable mounting means are provided such as bracket 56 affixed to closure member 45 for supporting motor 58.

As shown in FIGURE 2, upper or fan duct 26 communicates with the interior of cabinet 6 through an opening 60 in back wall 14. Similarly, lower duct or passage 24 communicates with the interior of cabinet 6 through opening 62, so that with door 8 closed and secured by latch means 64, smoke entering the enclosed space within cabinet 6 through opening 60 under the influence of fan unit 42, for example, may eventually exit through opening 62.

Suitable support or rotary means are provided within cabinet 6 such as spit 68 or grating 72 for supporting the item to be smoked, cured, or otherwise treated by the media which is recirculated throughout the interior of cabinet 6. Rotation of spit 68 may be accomplished manually or by drive means such as motor 66, while one or more spit clamps 70 are provided to hold the meat or other edible on the spit during rotation thereof. When the application of heat is not required during the smoking or curing process or rotation of the fish or meat is otherwise unnecessary, stationary support of the item by grating 72 may suffice instead of spit 68.

In the event that additional smoke, fumes or other curing media are desired in a particular case, means are provided in the form of a pan 74 supported on three or more upstanding members 76 and having a heating unit 78 mounted thereon to provide such additional media. Pan 74 and attached heating unit 78 are generally similar to smoke source 30 except as to the supporting means associated with each of the stated items and described in detail above.

A typical heating element such as may be used with smoke sources 30 and 74 is shown by FIGURE 5 wherein a pair of ceramic rods 80 and 82 is shown having dielectric connecting members 84 and 86 affixed thereto and holding the rods in fixed spaced relationship to each other. A coil of wire 88 and 90 such as nickel-silver is wound about each of the rods 80 and 82, respectively, with leads 92 for connecting the wire coils with a suitable source of power such as shown by FIGURE 6. In addition to their use with the stated sources of smoke, heating elements such as shown by FIGURE 5 may be mounted within chamber 6 and left unshielded to provide heat in the event that cooking of edibles is desired during smoke treatment thereof.

In the electrical schematic diagram shown by FIGURE 6, it may be seen that a single source of power such as symbolized by generator 94 may be used to operate the device disclosed herein. A master switch 96 is selectively operable to energize the circuit shown, while overload protection means such as fuse 98 are included in the circuit to function in a conventional manner. Motors 58 and 66 for operation of fan 54 and spit 68, respectively, are connected in parallel with separate switches 100 and 102 for selective operation of each item. Heating elements 40 and 78 for the seaprate smoke sources described above are also connected in parallel relationship with switches 104 and 106, respectively, provided for independent operation of either or both sources.

Two broadly differing types of operation of the device disclosed herein are diagrammatically shown by FIGURES 7 and 8. In FIGURE 7, smoke source 30 provides smoke which moves upwardly therefrom within transverse duct 28 under the influence of fan 54 which is rotated to cause movement of smoke or fumes in the directions indicated by arrows. Due to the compressive effects of flow into chamber 6 caused by rotation of fan 54, outlet flow from the stated chamber occurs through lower duct 24 into transverse duct 28 whereupon it is drawn upwardly by the suction effect of fan 54. The stated flow pattern as indicated by the arrows in FIGURE 7, may be seen to result in a generally circular path defined by ducts 24, 28, 26 and chamber 6 so that smoke originating from source 30 is continually recirculated through chamber 6 and supplemented by additional smoke as long as power is applied to heating unit 40. Moreover, air may be mixed with the smoke to cool or dilute the same by opening door 31 in smoke source 30 if desired.

Operation of the device disclosed herein as represented by FIGURE 8 differs from that shown by FIGURE 7 in that smoke source 74 within chamber 6 supplies smoke instead of smoke source 30, and rotation of fan 54 occurs in a direction opposite from that previously discussed. As a result, it may be seen from FIGURE 8 that smoke emanating from source 74 rises upwardly therefrom and as it approaches the upper portion of the chamber is drawn through fan 54 and thence into transverse duct 28. With door 31 closed and the escape of smoke or fumes at the lower end of duct 28 otherwise prevented, the stated media within duct 28 under pressure from fan 54 moves through lower duct 24 into the lower portion of chamber 6 as shown by the arrows in FIGURE 8 with the result that recirculation of the smoke or curing media occurs in chamber 6 in a similar manner but an opposite direction from that shown and discussed in connection with FIGURE 7. From the above discussion it may be seen that various types of operation of the device disclosed herein may be accomplished according to the individual requirements of each particular case. For example, smoke source 74 may obviously be used in the arrangement shown by FIGURE 7. Moreover, it may be seen from the description of structure set forth above relative to smoke sources 30 and 74 that the fuel used in providing smoke for operation of the device disclosed herein is not consumed by fire in the manner of an ordinary combustion process. Instead, the fuel, such as hickory chips, for example, is placed on the surface of a pan and heat is applied from beneath the pan. Rapid and complete combustion of the chips as accomplished by devices in the prior art wastes fuel and renders the smoke from such combustion full of ashes and other particles held in suspension which soils the edible sought to be smoke-treated. In the instant case, the fuel used to provide smoke or fumes is heated gradually and in controlled amounts to cook the fuel rather than to burn it completely. The rate at which smoke is produced and the quality of the smoke may be controlled in the device disclosed herein by selective operation of switches 104 and 106 to energize coils 40 or 78, respectively, to apply an optimum amount of heating depending upon the edible being smoke-treated, the composition of fuel being used, and the desired conditions of treatment.

The beneficial effects of smoke treatment as accomplished by the device disclosed herein are also enhanced by us of one or more additional heating elements as shown in FIGURE 5 and discussed above. The application of heat to roast or barbecue meat, fish or other edibles during smoke-treatment thereof enhances the effect of such treatment notably by improving the taste of the treated item, and this combined action also decreases the time required to prepare the edible for storage or consumption.

Thus, it may be seen from the discussion set forth above and from the accompanying drawings that means are provided in the instant case for rapid and efficient smoke treatment of edibles in small quantities with improved economy and ease. The device disclosed herein has been found extremely useful and practical in drying beef to make charqui and in smoke treating many different edibles including various kinds of meat, fish, and fowl. Moreover, the recirculation feature of this device materially reduces the time necessary to cure thoroughly or smoke-treat edibles, besides reducing considerably the amount of material required to produce smoke or fumes adequate to accomplish such curing or treatment. This reduction of time is especially due to the reversible flow characteristics of the device in that smoke may be directed first from above and then from below the edible for various periods of time, insuring that both the upper and lower surfaces thereof are exposed to smoke to the same approximate extent. In addition, since the device disclosed herein comprises a closed recirculation system without vents, the results set forth herein may be achieved without detachable odor or visible smoke or fumes even within a ten foot radius, thus permitting its use in crowded residential areas. Moreover, its lightweight and compact construction renders the device easily portable and ideally suited for use by private sportsmen at convenient locations, avoiding the problem incident to hasty transportation of an undivided carcass or catch of fish over long distances to a large storage or curing facility.

While the particular details set forth above and in the drawings are fully capable of attaining the objects and providing the advantages herein stated, the structure and method thus disclosed are merely illustrative and could be varied or modified to produce the same results without departing from the scope of the inventive concept as defined in the appended claims.

I claim:

Structure for treating edibles by flowing fumes thereover comprising a cabinet within which an edible substance may be completely contained while a substantially constant quantity of fumes continually recirculates around said substance, supply means for initially supplying said quantity of fumes including means for controlling the rate at which fumes are produced, fan means including a propeller, motor means including a reversible motor, said propeller being connected to said reversible motor for rotation of said propeller in two opposite directions to cause accelerated flow of said fumes through said chamber means in either of two generally prevailing opposite directions, duct means interconnecting said cabinet, said supply means and said fan means, and heating means comprising a source of heat contained within said chamber means for cooking said edibles simultaneously during treatment thereof by said fumes.

References Cited by the Examiner

UNITED STATES PATENTS

| 1,302,682 | 5/1919 | Legg | 99—260 |
| 1,964,372 | 6/1934 | Tygart | 99—260 |
| 2,096,373 | 10/1937 | Doherty. | |
| 2,505,973 | 5/1950 | Julian | 99—259 |
| 2,625,095 | 1/1953 | Julian | 99—259 |
| 2,842,043 | 7/1958 | Reuland | 99—259 |
| 2,930,310 | 3/1960 | Poppenburg | 99—261 |

ROBERT E. PULFREY, *Primary Examiner.*

GEORGE A. NINAS, JR., N. ANSHER, JEROME SCHNALL, *Examiners.*